(12) United States Patent
Boerrigter et al.

(10) Patent No.: US 7,803,845 B2
(45) Date of Patent: Sep. 28, 2010

(54) METHOD AND SYSTEM FOR GASIFYING BIOMASS

(75) Inventors: Harold Boerrigter, Amstelveen (NL); Peter Christiaan Albert Bergman, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 923 days.

(21) Appl. No.: 10/487,346

(22) PCT Filed: Aug. 22, 2002

(86) PCT No.: PCT/NL02/00557

§ 371 (c)(1),
(2), (4) Date: Jun. 14, 2004

(87) PCT Pub. No.: WO03/018723

PCT Pub. Date: Mar. 6, 2003

(65) Prior Publication Data

US 2004/0220285 A1 Nov. 4, 2004

(30) Foreign Application Priority Data

Aug. 22, 2001 (NL) .................................. 1018803

(51) Int. Cl.
*C07C 27/00* (2006.01)
*C07C 27/26* (2006.01)
*C12P 7/14* (2006.01)
*C12P 7/08* (2006.01)
*C12P 1/04* (2006.01)
*B01J 12/00* (2006.01)

(52) U.S. Cl. ........................ 518/726; 435/162; 435/163; 435/170; 422/188

(58) Field of Classification Search ................ 518/726; 435/162, 163, 170; 422/188
See application file for complete search history.

(56) References Cited

U.S. PATENT DOCUMENTS

| | | | | |
|---|---|---|---|---|
| 3,540,867 | A * | 11/1970 | Dernbach et al. | 48/197 R |
| 4,123,502 | A | 10/1978 | Holter et al. | |
| 4,206,186 | A | 6/1980 | Gresch et al. | |
| 4,211,539 | A | 7/1980 | Bierbach et al. | |
| 4,658,831 | A * | 4/1987 | Reinhard et al. | 600/510 |
| 6,991,769 | B2 * | 1/2006 | Kaneko et al. | 422/187 |
| 2004/0265158 | A1* | 12/2004 | Boyapati et al. | 417/572 |

FOREIGN PATENT DOCUMENTS

| | | | |
|---|---|---|---|
| GB | 1 520 041 | * | 8/1978 |
| WO | WO 01/52972 | * | 7/2001 |
| WO | WO 01/52972 A1 | | 7/2001 |

OTHER PUBLICATIONS

Merriam Webster's Collegiate Dictionary, Tenth Edition, p. 219, col. 1 lines 79-84.*

* cited by examiner

*Primary Examiner*—Jon P Weber
*Assistant Examiner*—Kailash C Srivastava
(74) *Attorney, Agent, or Firm*—Young & Thompson

(57) ABSTRACT

Method and device for cleaning synthesis gas obtained during gasification of biomass are disclosed. The synthesis gas is passed through a saturation device and an absorption device, both of which are fed with oil. In this way, the synthesis gas is scrubbed with oil and tar is substantially removed therefrom. The tar-containing oil which is released in this process is subjected to a cleaning step, as a result of which oil with a high percentage of tar and oil with a relatively low percentage of tar are formed. The first oil can be retuned to the gasification, and the remaining oil can be reused.

19 Claims, 2 Drawing Sheets

METHOD AND SYSTEM FOR GASIFYING BIOMASS

FIELD OF THE INVENTION

The present invention relates to a method for gasifying biomass, comprising the steps of introducing said biomass into a reactor and subjecting it to temperatures of between 600-1300° C., with substoichiometric quantities of oxygen being supplied, subjecting the synthesis gas obtained to a cleaning step in order to remove the grades of tar which are present from it, and feeding the synthesis gas to a consumer.

BACKGROUND OF THE INVENTION

The term biomass is understood as meaning cultivated plants, biomass residue streams, such as prunings, trimmings and waste from parks and public gardens, and waste such as wood from demolition work and the unseparated biodegradable fraction of domestic refuse and industrial waste.

Gasification of biomass has to be distinguished from pyrolysis of biomass. Pyrolysis differs from gasification in that in pyrolysis no oxygen whatsoever is supplied and the process takes place at a lower temperature (400-700° C.). In both processes, gas (synthesis gas, syngas or fuel gas) and char are formed. The gas contains components which are substantially liquid at room temperature, known as tars. In the case of pyrolysis, there is a significant percentage of tars (approximately 65% by weight based on the feed) for which particular processes have been developed in order to substantially separate this large quantity of liquid tar as product oil from the product gas. U.S. Pat. No. 4,206,186 relates to the pyrolysis of a waste stream. In this pyrolysis described, oxygen or oxygen-containing compounds is/are supplied and there is generally less than 10% by weight of tar present.

The pyrolysis gas is in this case treated with a purge oil and then cooled to above the dew point of water. Adsorption or absorption then takes place with the aid of dry mass. As a result, harmful inorganic substances are removed and then the water is condensed out. The water which is condensed out then has to be subjected to a thorough cleaning step in order for residual tar and other oil-like components to be removed. This requires filtration through activated carbon.

SUMMARY OF THE INVENTION

It is the object of the present invention to remove tar, even if it is present in very small quantities, from the gas (synthesis gas) before the latter is used further. An example of such further use which may be mentioned is its application in small power plants with a thermal output of, for example, 5-100 megawatts or for chemical syntheses.

If tars are present, they cause problems since, during cooling, they condense and form aerosols. Lowering the temperature is necessary, for example, in conjunction with a downstream water scrubbing step and also in order to achieve the highest possible efficiency in subsequent use of the gas in a motor. Condensation of tar and deposition of tar aerosols in, for example, downstream motors or on turbine blades or vanes of downstream gas turbines leads to blockage and damage. It is possible to remove a significant proportion of the tars by tar condensation in the water scrubbing step but this results in contamination of the water, the water-soluble tars (and specifically phenol) in particular causing problems, since they are difficult to remove from the water. The removal of tar aerosols in the water scrubbing step is very limited, and these aerosols continue to cause problems for the application of the gas.

The aim of removing tar from the synthesis gas obtained during the gasification is realised by the cleaning of synthesis gases comprising saturation thereof with an oil which is supplied separately, condensation of the said oil together with a fraction of the tar and passing the gas through an absorption device while further oil is being added to the gas, in order for the tar to be absorbed, discharging the cleaned gas, separating the tar from the oil. The complete saturation or supersaturation of the gas with the oil which is supplied makes it possible to ensure that all the essential organic impurities are removed from the gas.

Condensation of the oil and tar takes place in a separate step upstream of the absorption device, but may also take place partially in the absorption device. A combination is also possible. Saturation preferably takes place under atmospheric conditions. In the present context, the term substantially atmospheric conditions is understood as meaning a pressure which lies in the range between 0.8-2 bar.

In general, gas will be supplied to the scrubbing system, comprising a saturation, condensation and absorption device, at a relatively high temperature, such as approximately 500° C. Since the gas is at a higher temperature (700-1000° C.) when it leaves the gasification device, the heat which is released during the temperature drop can be used to heat the scrubbing system. It is also possible to include a separate intermediate cooling step, in which the high-quality heat obtained in this way can be used to good effect. It is important for the temperature in the scrubbing system to remain significantly above the dew point of the water which is/may be present in the synthesis gas, for example between 70 and 100° C. At atmospheric pressure and with a water content of approximately 10-15% by weight, the dew point is approximately 60° C., i.e. according to the present invention carrying out the supersaturation step at a temperature of below 120° C. ensures that all the organic components are absorbed, so that the water obtained no longer contains these components. It is not desirable for water to be separated out in the scrubbing step according to the invention. This preferably takes place in a downstream step. In a subsequent step of this type, for example, by means of a downstream water scrubbing step, in which the temperature is reduced further and water condenses, by way of example ammonia and hydrochloric acid can be removed. An ammonium salt, for example, ammonium sulphate, can be prepared from ammonia. Ammonium can be separated out of the synthesis gas and used to produce ammonium sulphate used in the chemical industry, textile industry, gas industry and for the production of fertilizer. Since with the abovementioned method tar has already been removed from the synthesis gas, the ammonium salt obtained is relatively pure. After removal, a simple crystallization step is sufficient to obtain further products for the chemical industry. The separation of tar from the ammonium salt obtained in this way is not necessary, unlike in processes which are known from the prior art and in which ammonia is removed from synthesis gas.

The method described above can be repeated a number of times in succession, either at the same temperature or at different temperatures.

It has been found that with the method described above, both grades of tar with a high boiling point and grades of tar with a low boiling point are removed. It has also been found that dust, soot, ash and other particles are scrubbed out.

According to an advantageous embodiment of the invention, at least a fraction of the oil which is used in the scrubbing/saturation process described above is fed to the reactor and participates in the gasification.

According to a further advantageous embodiment of the invention, the tar-laden oil is subjected to a separation step for the separation of tar/oil, the tar which is released in this step being fed to the reactor for gasification of the said biomass, and the oil obtained being at least partially returned to the saturation step, condenser or absorption step. Depending on the execution of the separation step, the tar which is returned may comprise approximately 50% of oil.

Although the quantity of tar which is returned to the reactor is very small, in terms of weight, this quantity, dependent on the composition of the gas, represents 5-20% of the energy content of the synthesis gas, which in this way is utilized beneficially, so that the efficiency increases.

After the step of saturation with oil in accordance with the present invention, the gas can be subjected to a water removal step, for example by condensation. As a result, it is possible for a further oil-saturation step, the temperature of which is significantly lower, since there is no longer a risk of water condensing out, to be connected downstream. In this step it is also possible to remove substances such as benzene, toluene and xylene.

Before the method according to the present invention is carried out, it is possible to separate solid particles out of the synthesis gas with the aid of a cyclone.

Depending on the oil which is used and the demands imposed on the oil, which has to move through the synthesis gas in order to separate out the tars, it is possible to decide on a greater or smaller percentage of recycling.

By using a venturi device, it is possible to provide for optimum supersaturation and condensation of the synthesis gas with oil. Downstream of the venturi, it is possible to collect condensing oil and tar upstream of the absorption device and to process them further as described or to simply remove this oil in the absorption step.

It is also possible to remove water-soluble tar compounds (such as phenol) during the absorption. This prevents these compounds from reaching any downstream water scrubbing step. After all, it has been found that it is particularly difficult for phenol to be removed again from the water.

The oil which is used in the method may be any mineral or vegetable oil which is known in the prior art. It is preferable to use a nonvolatile oil, and more particularly an oil in which the molecules comprise approximately 15-50 carbon atoms. The term nonvolatile is understood as meaning an oil grade which, at a temperature between 70 and 100° C., releases less than 10 mg of oil per standard cubic meter of cleaned synthesis gas. According to an advantageous embodiment of the invention, the tar which is separated out is preferably used as oil for the saturation and condensation process described above.

The present invention is preferably carried out under substantially atmospheric conditions, unlike in processes such as the cleaning step after coal and mineral oil residue gasification, which uses elevated temperatures of 1200-1500° C. and a pressure of approximately 10-40 bar, so that relatively light oil is used. In processes of this type, the formation of phenol is in principle unlikely, and therefore no special measures have to be taken as in the absorption device which is used according to the invention. According to the invention, the temperature of the gas during condensation of the said oil is higher than the dew point of any water present under the corresponding conditions, i.e. higher than 70-100° C.

The method described above results in cleaned synthesis gas being formed. This gas predominantly comprises carbon monoxide, hydrogen and carbon dioxide. Moreover, non-condensable hydrocarbons, such as $CH_4$, $C_2H_2$, $C_2H_4$, $C_2H_6$ and $C_3H_8$, as well as the hydrocarbons with a higher molecular weight, and inert components, such as nitrogen, argon and helium, may be present. The composition and concentrations are dependent on the biomass used. According to an advantageous embodiment of the method described above, further separation of the gas obtained in this way takes place in order to isolate some of the gases described above. One separation method is cooling, for example, cooling to −200° C. In this way, it is possible to obtain gases/gas mixtures which are utilized further, for example substituted for natural gas, fuel for generating electricity (in fuel cells), as raw materials for further chemical reactions, etc. If appropriate, a separation of this type may be carried out in stages. For example, in a first stage carbon dioxide can be separated out and, in a subsequent separation stage, the hydrocarbon-containing components can be separated from the other substances mentioned. This separation is not restricted to combination with the special gasification described above, but rather can be used in combination with any type of gasification and/or pyrolysis of biomass. This means that gas which is released during pyrolysis or gasification of biomass can be subjected to the separation treatment described above, and the product thus obtained can be used either as fuel or in the chemical industry.

It will be understood that the composition of these gases is dependent not only on the biomass supplied but also on the conditions under which the gasification according to the present invention is carried out. This relates to both the temperature and the quantity of oxygen. With the method described above, it is possible to provide a synthesis gas in which no dust or organic impurities/inorganic impurities are present which can cause problems in separation processes for obtaining specific gases from the synthesis gas. Problems of this nature arise, inter alia, in cryogenic product separation.

In the method described above, both light and heavy tar grades are formed. The light tar grades are organic compounds, such as phenol, benzene, toluene, xylene and naphthalene. These too can be usefully exploited, either in combination or as separate streams. These substances can also be used as basic chemicals in the chemical industry. They can also be used as solvents.

The heavy tar grades which are formed in the method described above contain organic compounds with a relatively high boiling point, such as anthracenes, fluoranthene and phenanthrene. These heavy tar grades can either be discharged directly for further use or may first be separated. Possible fractions are carbolineum, creosote oil, pitch, light anthracene oil and heavy anthracene oil. Substances of this type can also be used in the paint, coatings, lubricant industries, for concrete preparation, in medicaments and in the paper industry. Light tar grades which are formed in the process described above can likewise be exploited usefully in the chemical industry and are suitable for the production of fuels.

The invention will be explained in more detail below with reference to an exemplary embodiment depicted in the drawing, in which:

DETAILED DESCRIPTION OF THE INVENTION

Figure 1:
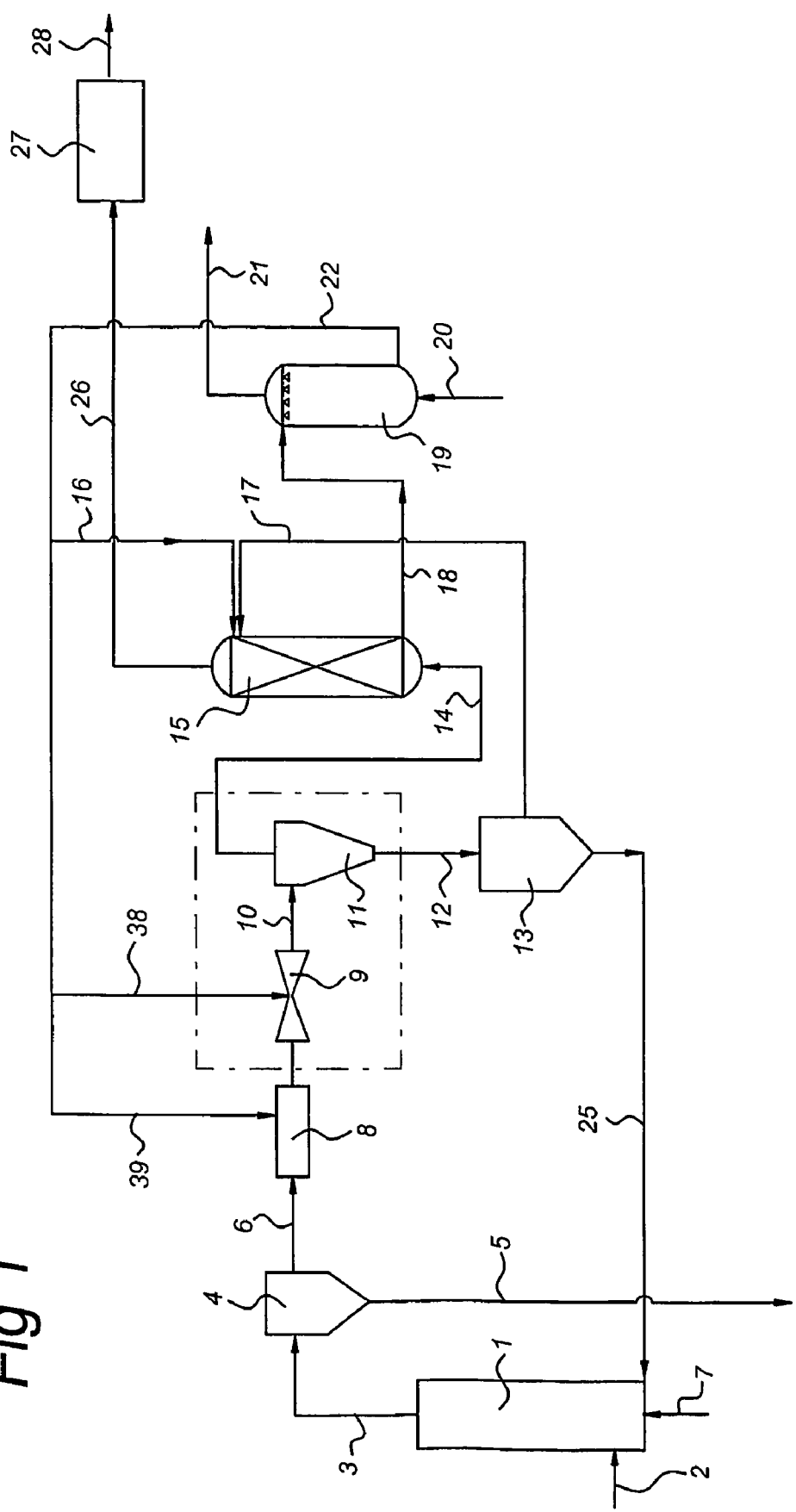
FIG. 1 provides a highly diagrammatic illustration of an example of the method according to the present invention.

In these figures, 1 denotes a gasifier. Feed for a material which is to be gasified to the gasifier is denoted by 2. The feed of gasification medium with oxygen or oxygen-containing compounds to the gasifier 1 is denoted by 7. The discharge of synthesis gas is denoted by 3. This synthesis gas is initially passed into a cyclone 4, where solid particles are separated out and discharged via line 5.

The synthesis gas 6 which comes out of the cyclone 4 is passed through a saturation device 8. Saturation with oil has to be carried out at a relatively high temperature, since according to the invention the oil is supplied in liquid form and has to be evaporated. A temperature of 280° C. is mentioned by way of example. If appropriate, a cooler may be connected upstream of the saturation device. This is described in more detail with reference to FIG. 3.

In saturation device 8, the synthesis gas is saturated with possibly hot oil by sprinkling. Oil comes out of line 39. There is a venturi in condensation device 9. Close to the location with the highest gas velocity, cold oil is injected via line 38, so that the gas is supersaturated, the oil and the tar condense and form droplets which grow as a result of the supersaturation and the reduction in the temperature. In the process, the aerosols are also removed as a result of them accumulating to form larger drops.

The oil-saturated synthesis gas together with the oil/tar drops then flows through line 10 to a gas/liquid separator 11. Oil/tar liquid which is released in the process passes via line 12 to a separation device 13. Separation is carried out in this separation device on the basis of gravity. The heavier fraction, which contains more tar, is discharged to line 25. This fraction may be passed completely or partially to the gasifier.

According to a particular variant of the invention, it is possible to arrange a separation device in line 25, by means of which oil and tar/oil products are separated. In this case, the oil can be introduced back into the process, i.e. is not fed to the inlet of the gasifier 1. The tar/oil products may either be fed to the gasifier 1 or be utilized in industry.

It will be understood that this step of separating oil and tar can be used for any oil/tar mixture which is formed in gasification or pyrolysis and in which tar which is formed is utilized further, for example, in the chemical industry.

The synthesis gas is fed to absorption device 15 via line 14. Also, in the process, any aerosols which are present are removed. Oil is fed into this absorption column 15 via line 16 and/or 17 at a temperature of preferably 70 to 100° C. The scrubbing oil moves from the top downward through the absorption device. As a result, the synthesis gas is brought into contact, in countercurrent, with the scrubbing oil. The synthesis gas cools down in the absorption device, so that as well as absorption of gaseous tar compounds (including the water-soluble tars), condensation of tar may also take place. The absorption device may be designed as a plate-type scrubbing device or may be provided with packing. In this case the absorption device is designed in such a manner that water just does not condense under the prevailing conditions (pressure, temperature and fraction). Residual tar will dissolve in the oil.

The mixture of oil and tar grades is discharged via line 18 to a regenerator 19. Possibly preheated air is introduced via inlet 20. By bringing oil into contact with air, the absorbed gaseous tars are for the most part separated out and discharged into the air via line 21. The contact is preferably effected by sprinkling. Line 21 is connected to line 7, i.e. the tar compounds in the released air/tar mixture which are separated out during the regeneration are fed back to the gasification. According to a particular variant of the invention, it is possible for a separation device to be arranged in line 18 in order to separate the oil and oil/tar product and possibly to separate out specific tar components or groups of components.

It will be understood that the tar components or groups of components which are separated out can be exploited further, for example, in the chemical industry.

The oil which is released is discharged via line 22, which is connected to lines 16, 38 and 39.

In separation device 13, tar/oil mixtures which come out of line 12 are separated as far as possible and the tar, which may comprise up to 50% of oil is returned via line 25 to the gasifier 1, while oil from which tar has been substantially removed is introduced back into the oil circuit via line 17.

The synthesis gas from which tar has been removed is fed via line 26 to a water scrubbing stage 27. If appropriate, heat exchangers may be connected into lines 3, 5 and 26, in order to reduce the temperature of the synthesis gas, and this heat can be put to good use elsewhere in the process or in some other way. If appropriate, heat exchangers may be connected into lines 16 and/or 17, 38 and 39, in order to bring the oil to the desired temperature. For line 16 and/or 17, this temperature is 70-100° C., for line 38 it is 20-100° C. and for line 39 it is, for example, 280° C. 28 denotes the line connected to an internal-combustion engine or the like, where the synthesis gas is utilized.

Above just one exemplary embodiment of the possible ways of removing tar from synthesis gas in accordance with the present invention has been described. It will be understood that numerous variants are possible and that certain parts can be omitted or replaced by other separation and/or mixing devices which are known in the prior art. For example, it is possible to omit the step of returning a fraction of the oil via line 25, depending on the process conditions. Moreover, it is possible to integrate various of the parts which are described separately in the present text, which not only results in a compact installation but also has the advantage that energy can be utilized optimally and that the various process streams can be simplified. FIG. 2 shows, as an example, the further path of the process described above. 27 corresponds to block 27 in FIG. 1, i.e. the availability of a clean synthesis gas. This can then be subjected to a gas-conditioning step at 28, with cryogenic product separation taking place at 29. On one side, residual gas is released, as indicated by 30 and on the other side, products which are denoted by 31 are formed.

Cooling may take place in various stages. During a first stage, $CO_2$ can be removed (solidification point −78° C.). During a subsequent stage, most of the hydrocarbon compounds can be separated out. If cooling takes place as far as −161° C., a mixture similar to LNG is formed, and the residual gas is syngas, i.e. a mixture of $H_2$ and CO.

As an intermediate stage, cooling can take place (in stages) to −104° C., during which stage $C_2H_4$ and $C_2H_2$ are obtained, and these compounds can be used in the chemical industry. The residual gas formed in this case consists of the syngas referred to above and specific hydrocarbon compounds, such as methane. These can be used to supply energy. Of course, it is also possible for cooling to take place in a large number of stages, in which case components such as $NH_3$ and $CO_2$ can be discharged together and/or separately.

In the manner described above, it is possible by gasifying biomass, to obtain raw materials for the chemical industry (such as ethene) without complicated intermediate steps being required.

Figure 2:
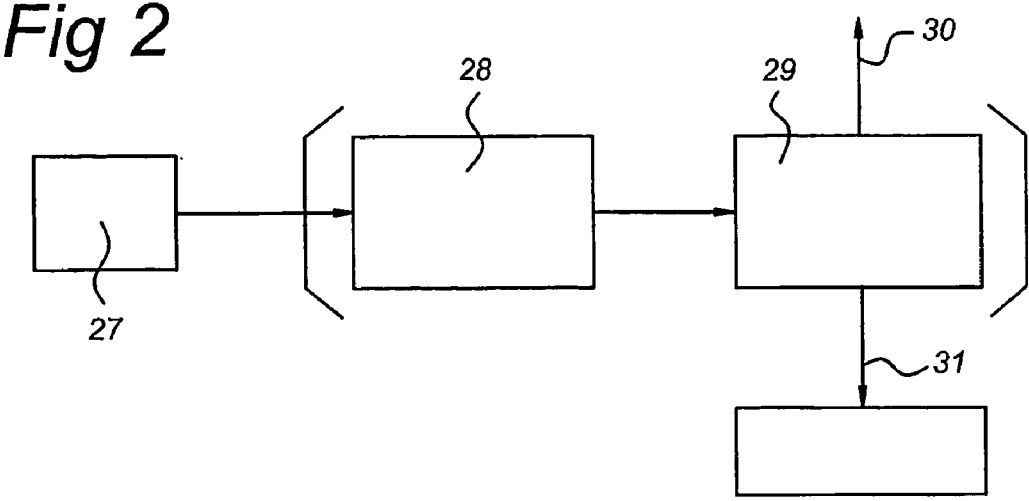
FIG. 2 shows further processing of the synthesis gas obtained in this method.
Figure 3:
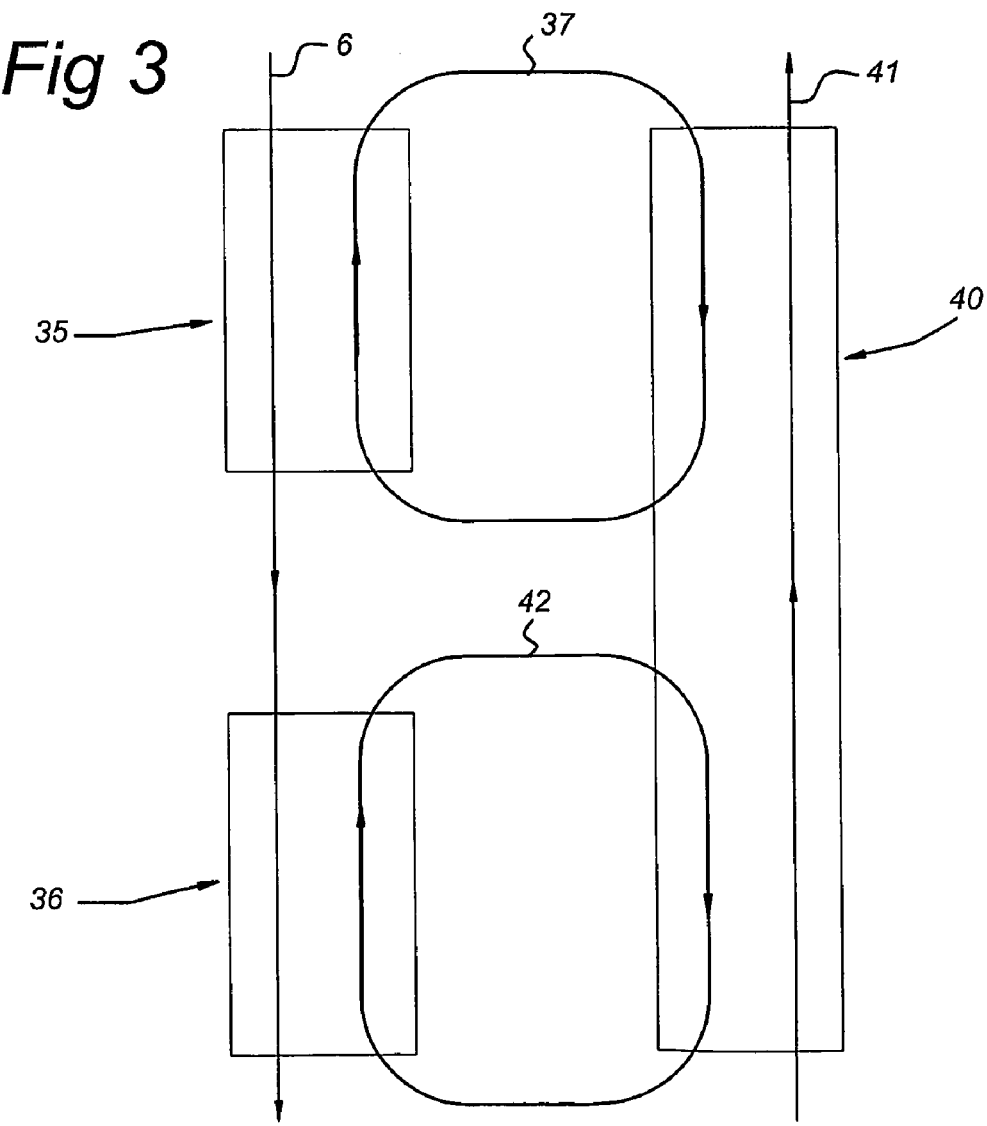
FIG. 3 diagrammatically depicts the cooling of the synthesis gas.

FIG. 3 diagrammatically depicts the precooling of the synthesis gas and the saturation (cf. 8 in FIG. 1). Cooling of the synthesis gas from the gasifier takes place both during the precooling and during the saturation. The precooler is denoted by 35, while in this specific example, the saturation device is denoted by 36. The precooler may comprise a heat exchanger with separate media, i.e. there is no direct contact between the gas and the circulating medium, which is denoted by 37. This circulating medium 37 exchanges heat with a further exchanger, which is denoted by 40 and which is used to generate supersaturated steam 41. To avoid precipitation on the heat exchanger walls, the temperature drop in heat exchanger 35 is limited to 350° C. Above this temperature, there is a negligible risk of precipitation. Instead of the separate media described above, direct contact is possible, with the aid, for example, of a solid substance, such as sand, in which case it has been found that in the process dust, ash and soot as well as other solid particles, are also removed from the gas.

Direct sprinkling of the gas with the aid of oil 41 takes place in heat exchanger 36. Impurities and condensate products are scrubbed out by the oil, and since there is direct contact, there is no risk of heat-exchanging surfaces being contaminated.

It is possible for this medium 41 to be brought into heat exchange with the steam 42 which is to be heated.

It should be understood that this step of at least two-stage cooling of gas which is obtained can also be used in other processes, for example in other gasification of biomass and/or pyrolysis thereof. Moreover, the above-described way of cleaning gases can also be used in other gases with organic impurities (coke gas, industrial gas and gasses which are released in the chipboard industry).

Modifications of this nature lie within the scope of the present invention as described in the appended claims.

The invention claimed is:

1. A method for gasifying biomass, which comprises:
  A. introducing said biomass into a reactor, and subjecting said biomass to temperatures of between 600-1300° C. at a pressure range of 0.8-2 bar, while supplying substoichiometric quantities of oxygen to obtain a synthesis gas;
  B. cleaning the synthesis gas in order to remove grades of tar therefrom;
  wherein cleaning the synthesis gas comprises:
    (i) saturating or supersaturating the synthesis gas with a separately supplied oil;
    (ii) condensing said oil with a fraction of the tar to obtain a gas stream and a tar-laden oil;
    (iii) passing the gas stream through an absorption device while adding further oil in order to absorb the tar and obtain a cleaned synthesis gas and an oil tar mixture, such that absorption is effected in such a manner that water does not condense under prevailing conditions;
    (iv) discharging the cleaned gas; and
    (v) separating at least a fraction of the tar out of said further oil tar mixture in step B (iii).

2. The method according to claim 1, wherein said at least fraction of the tar from step B (v) is fed to the reactor.

3. The method according to claim 1, wherein the tar-laden oil from step B (ii) is at least in part subjected to a separation step for separating tar/oil, during which,
  (a) the tar which is released is fed to the reactor for gasification of the biomass, and
  (b) the oil obtained is at least partially returned to the saturation, condensation or absorption step.

4. The method according to claim 1, wherein the synthesis gas stream is subjected to a water-removal step after having been saturated or supersaturated with oil.

5. The method according to claim 1, wherein the cleaned synthesis gas is passed through a water scrubbing device.

6. The method according to claim 1, wherein any ammonium present is removed from the synthesis gas as ammonium salt, said salt being subjected to a crystallization step.

7. The method according to claim 1, wherein the synthesis gas is subjected to a mass-based separation before the cleaning step.

8. The method according to claim 1, wherein the oil comprises molecules having on average 15-50 carbon atoms.

9. The method according to claim 1, wherein the temperature of the synthesis gas during the condensing step is higher than the dew point of any water present.

10. The method according to claim 3, wherein the tar which is released is at least in part fed to the reactor for gasification of the biomass.

11. The method according to claim 3, wherein the tar which is released is at least in part discharged and subjected to a further separation step.

12. The method according to claim 3, wherein the oil/tar mixture is contacted with preheated air to obtain absorbed gaseous tars, which are fed to the reactor for gasification of the biomass.

13. The method according to claim 1, wherein said synthesis gas obtained after the water-removal step is further saturated with oil at a temperature of less than 50° C.

14. A system for gasifying a biomass, comprising:
  (A) a reactor for gasifying the biomass at 600-1300° C. and at a pressure range of 0.8-2 bar, said reactor having a feed for biomass and gasification medium and a discharge for synthesis gas;
  (B) a cleaning device for removing tar from the synthesis gas; said cleaning device comprising, fluidly arranged in series,
    (i) a saturation device for completely saturating or supersaturating said synthesis gas with oil,
    (ii) a downstream condensation device for condensing oil with a fraction of tar, and
    (iii) a downstream absorption device to absorb the tar configured such that absorption is effected in such a manner that water does not condense under prevailing conditions, each having an oil feed for bringing the synthesis gas into contact with oil; said cleaning device comprising a low-level inlet for gas and a high-level outlet for gas, and a discharge for tar-laden oil.

15. The system according to claim 14, further comprising a separation device for separating tar-laden oil into oil and tar; said separation device having an inlet connected to a discharge of the saturation device to saturate or supersaturate said synthesis gas with oil, condensation device and/or absorption device to condense said oil and tar/or absorb the tar, a tar outlet fluidly connected to the reactor and an oil outlet fluidly connected to the oil feed of the saturation device, condensation device and/or absorption device.

16. The system according to claim 14, comprising a centrifugal separation device which is connected upstream of the saturation device.

17. The system according to claim 14, further comprising a dust filter to remove any dust, said filter is connected upstream of the saturation device.

18. The system according to claim 14, comprising a gas cooler which is connected upstream of the saturation device.

19. A system for gasifying a biomass, comprising:
  A. a reactor for gasifying the biomass at 600-1300° C. and at a pressure range of 0.8-2 bar, said reactor having a feed for biomass and gasification medium and a discharge for synthesis gas;

B. a cleaning device for removing tar from the synthesis gas at 0.8-2 bar; said cleaning device comprising, fluidly arranged in series,
   (i) a saturation device for completely saturating or supersaturating said synthesis gas with oil,
   (ii) a downstream condensation device for condensing oil with a fraction of tar, and
   (iii) a downstream absorption device configured such that absorption is effected in such a manner that water does not condense under prevailing conditions, each having an oil feed for bringing the synthesis gas into contact with oil; said cleaning device comprising a low-level inlet for gas and a high-level outlet for gas, and a discharge for tar-laden oil.

* * * * *